US011546161B2

(12) United States Patent
Ng et al.

(10) Patent No.: US 11,546,161 B2
(45) Date of Patent: Jan. 3, 2023

(54) ZERO KNOWLEDGE PROOF HARDWARE ACCELERATOR AND THE METHOD THEREOF

(71) Applicant: Hong Kong Applied Science and Technology Research Institute Company Limited, Hong Kong (CN)

(72) Inventors: Chi Wai Ng, Hong Kong (CN); Wei Lun Alan Cheung, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 363 days.

(21) Appl. No.: 16/797,042

(22) Filed: Feb. 21, 2020

(65) Prior Publication Data

US 2021/0266168 A1     Aug. 26, 2021

(51) Int. Cl.
  *H04L 9/32*   (2006.01)
  *G06F 9/38*   (2018.01)
  *G06F 9/355*  (2018.01)
  *G06F 17/14*  (2006.01)

(52) U.S. Cl.
  CPC .......... *H04L 9/3218* (2013.01); *G06F 9/3555* (2013.01); *G06F 9/3877* (2013.01); *G06F 17/142* (2013.01)

(58) Field of Classification Search
  None
  See application file for complete search history.

(56) References Cited

U.S. PATENT DOCUMENTS

| 9,749,297 B2 | 8/2017 | Gvili |
| 9,959,214 B1 * | 5/2018 | Habusha ............. G06F 9/45558 |
| 10,101,969 B1 * | 10/2018 | Ruan ....................... G06F 7/722 |
| 10,432,405 B1 | 10/2019 | Hu et al. |

(Continued)

FOREIGN PATENT DOCUMENTS

| CN | 109981276 A * | 7/2019 |
| CN | 109981276 A | 7/2019 |

(Continued)

OTHER PUBLICATIONS

"SNARKs for C: Verifying Program Executions Succinctly and in Zero Knowledge" Madars Virza B.Sc., University of Latvia (Year: 2014).*

(Continued)

*Primary Examiner* — Bassam A Noaman
(74) *Attorney, Agent, or Firm* — S&F/WEHRW

(57) ABSTRACT

A hardware accelerator for accelerating the zero knowledge succinct non-interactive argument of knowledge (zk-SNARK) protocol by reducing the computation time of the cryptographic verification is disclosed. The accelerator includes a zk-SNARK engine having one or more processing units running in parallel. The processing unit can include one or more multiply-accumulate operation (MAC) units, one or more fast Fourier transform (FFT) units; and one or more elliptic curve processor (ECP) units. The one or more ECP units are configured to reduce a bit-length of a scalar $d_i$ in an ECP algorithm used for generating a proof, thereby the cryptographic verification requires less computation power.

16 Claims, 10 Drawing Sheets

(56) References Cited

U.S. PATENT DOCUMENTS

| | | | |
|---|---|---|---|
| 2007/0064932 A1* | 3/2007 | Struik | G06F 7/725 |
| | | | 380/30 |
| 2008/0063189 A1* | 3/2008 | Katti | G06F 7/5332 |
| | | | 708/625 |
| 2014/0032917 A1* | 1/2014 | Morioka | H04L 9/3252 |
| | | | 713/176 |
| 2016/0359630 A1* | 12/2016 | Scott | H04L 9/0844 |
| 2017/0091750 A1 | 3/2017 | Maim | |
| 2017/0212246 A1* | 7/2017 | Houchi | G01S 19/30 |
| 2017/0277904 A1 | 9/2017 | Adams et al. | |
| 2017/0278100 A1 | 9/2017 | Kraemer et al. | |
| 2018/0302488 A1* | 10/2018 | Matsuda | H04L 67/2833 |
| 2019/0026146 A1 | 1/2019 | Peffers et al. | |
| 2019/0266577 A1* | 8/2019 | Baldet | G06Q 20/10 |
| 2021/0241071 A1* | 8/2021 | Lorrain | G06F 5/01 |

FOREIGN PATENT DOCUMENTS

| | | | |
|---|---|---|---|
| CN | 110363509 A | | 10/2019 |
| CN | 110489393 A | * | 11/2019 |
| EP | 3432146 A1 | | 1/2019 |
| WO | 2004/054168 A1 | | 6/2004 |
| WO | 2017/103763 A1 | | 6/2017 |
| WO | 2018/176238 A1 | | 10/2018 |

OTHER PUBLICATIONS

Ritzenthaler (Point counting on elliptic curves), May 2009. (Year: 2009).*

Linderman, Architectural Considerations for a 500 TFLOPS Heterogeneous HPC, The Air Force Research Lab (Year: 2010).*

Ben-Sasson et al.; Zerocash: Decentralized Anonymous Payments from Bitcoin; 2014 IEEE Symposium on Security and Privacy; DOI: 10.1109/SP.2014.36.

International Search Report and Written Opinion of PCT application No. PCT/CN2020/076894 issued from the International Search Authority dated Nov. 25, 2020.

* cited by examiner

ZERO KNOWLEDGE PROOF HARDWARE ACCELERATOR AND THE METHOD THEREOF

LIST OF ABBREVIATIONS

ASIC application specific integrated circuit
CPU central processing unit
CS constraint system
DDR double data rate
SDRAM synchronous dynamic random-access memory
ECP elliptic curve processor
FFT fast Fourier transform
FPGA field-programmable gate array
FSM finite state machine
iFFT inverse fast Fourier transform
MAC multiply-accumulate operation
PCI-e peripheral component interconnect express
PCI peripheral component interconnect
PF prove function
pk proving key
QAP quadratic arithmetic programs
R1CS rank-1 constraint system
VF verification function
vk verification key
zk-SNARK zero knowledge succinct non-interactive argument of knowledge
ZKP zero knowledge proof

FIELD OF THE INVENTION

The present disclosure generally relates to a method and an apparatus for accelerating the zk-SNARK, and particularly relates to a method and an apparatus configured to reduce the processing time of the proof generation and proof verification for the zk-SNARK protocol using a semiconductor device.

BACKGROUND OF THE INVENTION

In cryptography, ZKP is a method by which a prover can interact with a verifier and provide proof of knowledge to the verifier without unveiling the confidential data. The notion of "zero knowledge" allows the prover to show to the verifier that a statement is true, without revealing any information beyond the validity of the statement. Therefore the privacy on the content of the prover can be preserved and protected.

ZKP is particularly useful in providing a privacy-preserving verification, thereby realizing a decentralized anonymous payment transaction, such as Zcash. One example of a ZKP is the zk-SNARK. The zk-SNARK protocol uses several algorithms to achieve a proof of knowledge with reduced proof size, including a key generation, a proof generation, and a proof verification. The key generation uses a secret key to generate a proving key (pk) and a verification key (vk) pair, and then subsequently discards the secret key for security. The proof generation generates a proof without disclosing the secret key. The proof is relatively small in size, so the proof verification can verify the proof relatively quickly without acquiring any knowledge of the secret key. The computation requirement of the proof verification is very low.

For the proof generation, a proof is created from the secret key by the computation of complex equations, which is in the form of polynomial equations. The process may be very computationally intensive and requires high computation power. As an illustrative example, a software implementation of the proof generation may involve a calculation of equations of millions of steps iteratively. Each step may require a computation of additions and multiplications. Therefore, the generation of a proof may require extensive processing time and computer resources.

US 201900261461A1 discloses apparatuses for accelerating blockchain transaction. The circuitry includes an accelerator (e.g. FPGA or ASIC), which may provide dedicated hardware resources to accelerate highly expensive ZKP or homomorphic encryption operations, returning valid/invalid, and a set of ledger state updates. However, the accelerator may only include one or more processing circuits, which is analogous to a separated processor having conventional structures for performing the zk-SNARK operation. There is no description of any particular structures or designs of circuitry in the accelerator for improving the efficiency of the proof generation.

Accordingly, there is a need in the art for a method and an apparatus that seeks to address at least some of the above problems by accelerating the zk-SNARK. Furthermore, other desirable features and characteristics will become apparent from the subsequent detailed description and the appended claims, taken in conjunction with the accompanying drawings and this background of the disclosure.

SUMMARY OF THE INVENTION

Provided herein is a method and an apparatus for accelerating the cryptographic verification under the zk-SNARK protocol. It is an objective of the present disclosure to provide a method and an apparatus that can reduce the processing time of the proof generation and proof verification using a hardware accelerator, such as FPGA or other semiconductor devices.

In accordance with certain embodiments of the present disclosure, an accelerator for computing a cryptographic verification under a zk-SNARK protocol is provided. The accelerator comprises a zk-SNARK engine, wherein the zk-SNARK engine comprises one or more processing units running in parallel.

Preferably, the zk-SNARK engine comprises at least four processing units. Each of the processing unit comprises one or more MAC units; one or more FFT units; and one or more ECP units. The one or more ECP units are configured to reduce a bit-length of a scalar $d_i$ in an ECP algorithm used for generating a proof, thereby the cryptographic verification requires less computation power. The ECP algorithm is $R_i = \sum_{i=0}^{N-1} d_i P_i$,
where:
$N = 2^n$;
$n > 11$;
$d_i$ is a scalar; and
$R_i$ and $P_i$ are points on an elliptic curve.

In accordance with a further aspect of the present disclosure, the one or more ECP units are configured to find a largest value $d_1$ and a second largest value $d_2$ with respect to the scalar $d_i$; calculate a difference of scalar $d_{diff}$ having few bits than $d_1$ and $d_2$; and obtain two new pairs of points $(d_{diff}, P_1)$ and $(d_2, P_{add})$ to replace original points $(d_1, P_1)$ and $(d_2, P_2)$;
where:
$P_1$ and $P_2$ are points on the elliptic curve with respect to $d_1$ and $d_2$; and
$P_{add}$ is an addition of $P_1$ and $P_2$.

In accordance with a further aspect of the present disclosure, the MAC unit includes a plurality of MAC blocks.

Each of the plurality of MAC blocks is a finite field computing element and the plurality of MAC blocks is partitioned into plural MAC block groups, each MAC block group being configured to perform data operations and consisting of either one or two MAC blocks.

Preferably, each of the plurality of MAC blocks includes an adder and a multiplier configured to execute Montgomery Multiplication over a finite field.

In accordance with a further aspect of the present disclosure, the one or more FFT units are configured to perform a large size FFT operation and a large size iFFT operation by decomposing the large size FFT operation or the large size iFFT operation into a number of smaller FFT units Preferably, the smaller FFT units comprise a 1024-point FFT unit and a 2048-point FFT unit. The large size FFT operation has $2^{21}$ points. The large size iFFT operation has $2^{21}$ points. The 1024-point FFT unit utilizes a plurality of radix-4 FFT units. The 2048-point FFT unit utilizes a plurality of radix-2 FFT units and the plurality of radix-4 FFT units.

In accordance with a further aspect of the present disclosure, each of the processing units comprises four MAC units, one FFT unit, and four ECP units.

In certain embodiments, the accelerator includes a DDR controller and a DDR SDRAM. The DDR controller is communicatively coupled to a processor, wherein the processor is configured to execute an application software for responding to instructions.

Preferably, the accelerator is provided on a network server remotely accessible by the processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

Skilled artisans will appreciate that elements in the figures are illustrated for simplicity and clarity and have not necessarily been depicted to scale.

DETAILED DESCRIPTION OF THE INVENTION

The present disclosure generally relates to a method and an apparatus for accelerating the zk-SNARK protocol. More specifically, but without limitation, the present disclosure relates to a method and an apparatus configured to reduce the processing time of the proof generation and proof verification for the zk-SNARK protocol using a semiconductor device. An objective of the present disclosure is to use hardware accelerator to reduce the computation time such that the cryptographic verification under the zk-SNARK protocol can be performed efficiently.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

At least part of the hardware accelerator apparatus of the disclosed embodiments may be implemented in a FPGA, and it is apparent that the apparatus of the present disclosure may also be encompassed within other semiconductor devices, including but not limited to an ASIC, a microcontroller, a programmable I/O device, a PCI controller, or a combination of any aforesaid devices.

The present invention is developed by utilizing a semiconductor device to accelerate the proof generation and proof verification process for the zk-SNARK protocol. The zk-SNARK protocol is an efficient variant of the ZKP, and can be found in the disclosure of Zerocash: Eli Ben-Sasson et al., "Zerocash: Decentralized Anonymous Payments from Bitcoin", 2014 *IEEE Symposium on Security and Privacy*, DOI 10.1109/SP.2014.36.

Figure 1:
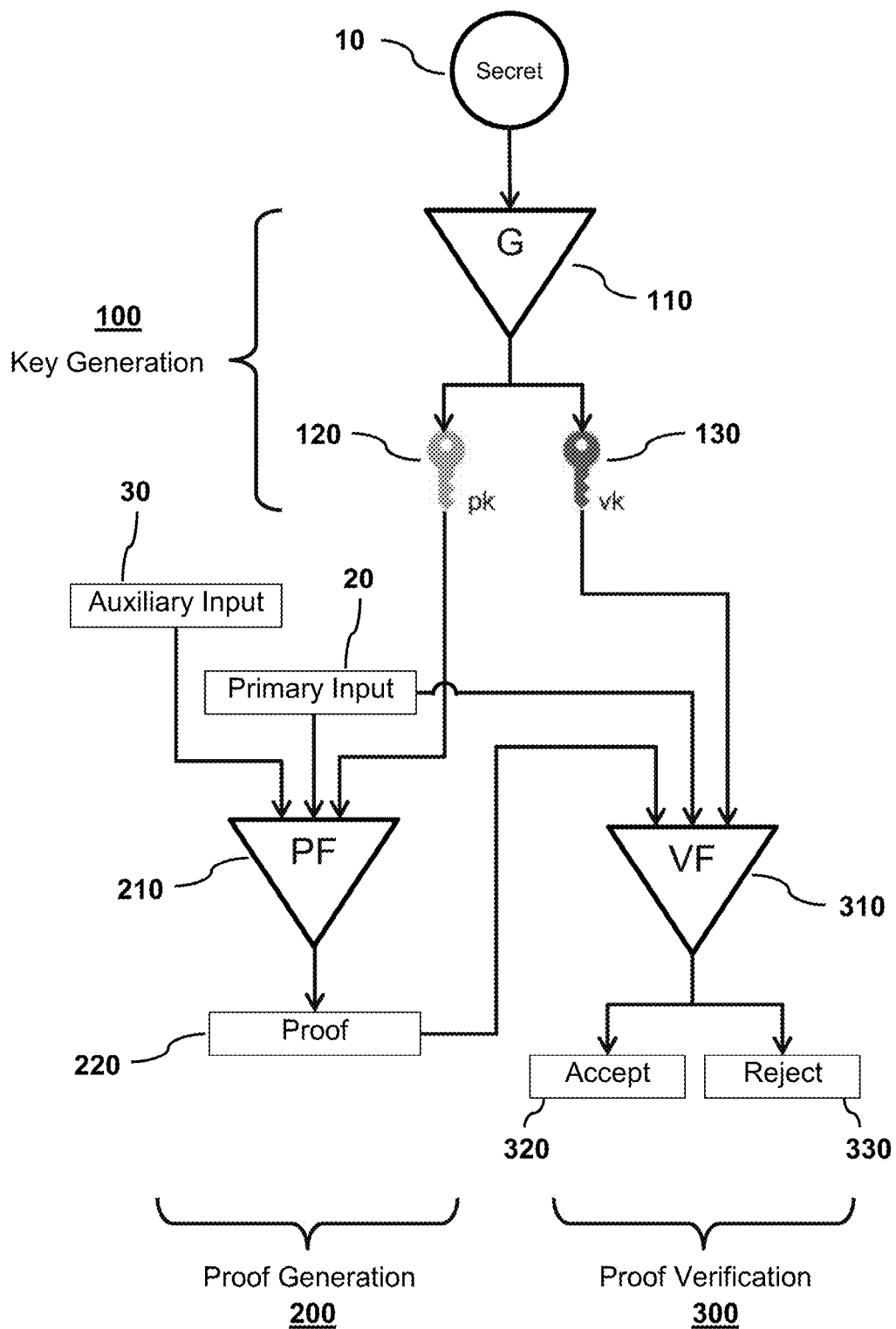
FIG. 1 depicts a flow diagram illustrating the cryptographic verification under a zk-SNARK protocol.

The cryptographic verification under a zk-SNARK protocol comprises a key generation 100, a proof generation 200, and a proof verification 300, as illustrated in FIG. 1. The zk-SNARK protocol has the advantage of allowing a prover to prove to another verifier that a statement is true, without revealing any information beyond the validity of the statement itself. The key generation 100 may receive a secret key 10 to generate a pk 120 and a vk 130 pair, and then subsequently discards the secret key 10 for security. The secret key 10 is a security parameter entered to a key generator G 110, which includes the function sought to be proved, for probabilistically sampling a plc 120 and a vk 130 pair. The key pair is in public domain and can be used for proof generation 200 and proof verification 300. For the proof generation 200, with the pk 120 from the key generation 100, a primary input 20 and an auxiliary input 30, which is a nondeterministic and untrusted advice, are provided to a PF 210 of the proof generation 200 for the generation of a proof 220. The PF 210 comprises equations of the proof, and the proof 220 is a non-interactive proof of knowledge that is succinct. The proof 220 is very short and easy to verify by using the vk 130. The proof verification 300 is a step for verifying the proof 220, which can be repeated any number of times, and each time may have different inputs. The vk 130, the proof 220, and the primary input 20 are input to the VF 310 for checking the proof 220. In particular, the VF 310 is not a complex function and the computation requirement of VF 310 is very low for determining whether the proof 220 is accepted 320 or rejected 330.

With the use of the zk-SNARK protocol for cryptographic verification in a blockchain application, the generation of proof 220 and the proof verification 300 may consume a lot of computation power and require a high-performance operating system. Conventionally, the computation of the cryptography algorithms is achieved by software implementation, which may require one or more processors in a network server or a computer system. The proof generation 200 uses the secret key 10, which is in the form of polynomial equations, to create a proof 220 without disclosing the secret key 10. The proof verification 300 verifies the validity of the proof 220 without acquiring knowledge of the secret key 10. Both operations may require extreme computation demand on the processors. The zk-SNARK protocol involves solving multiple large instances of tasks about polynomial arithmetic over cryptographically large prime fields and about multi-scalar multiplication over elliptic curve groups. For solving the tasks, such as FET, the algorithms are notoriously memory intensive. In order to meet the demand in computation power, dedicated hardware accelerator, such as an ASIC, a FPGA, or other semiconductor devices, may be used to perform at least part of the computation in associated with the cryptography algorithms. Therefore, the hardware accelerator can contribute to the most difficult and complex part of the calculations, and reduce the computation time such that the cryptographic verification under the zk-SNARK protocol can be performed efficiently.

Figure 2:
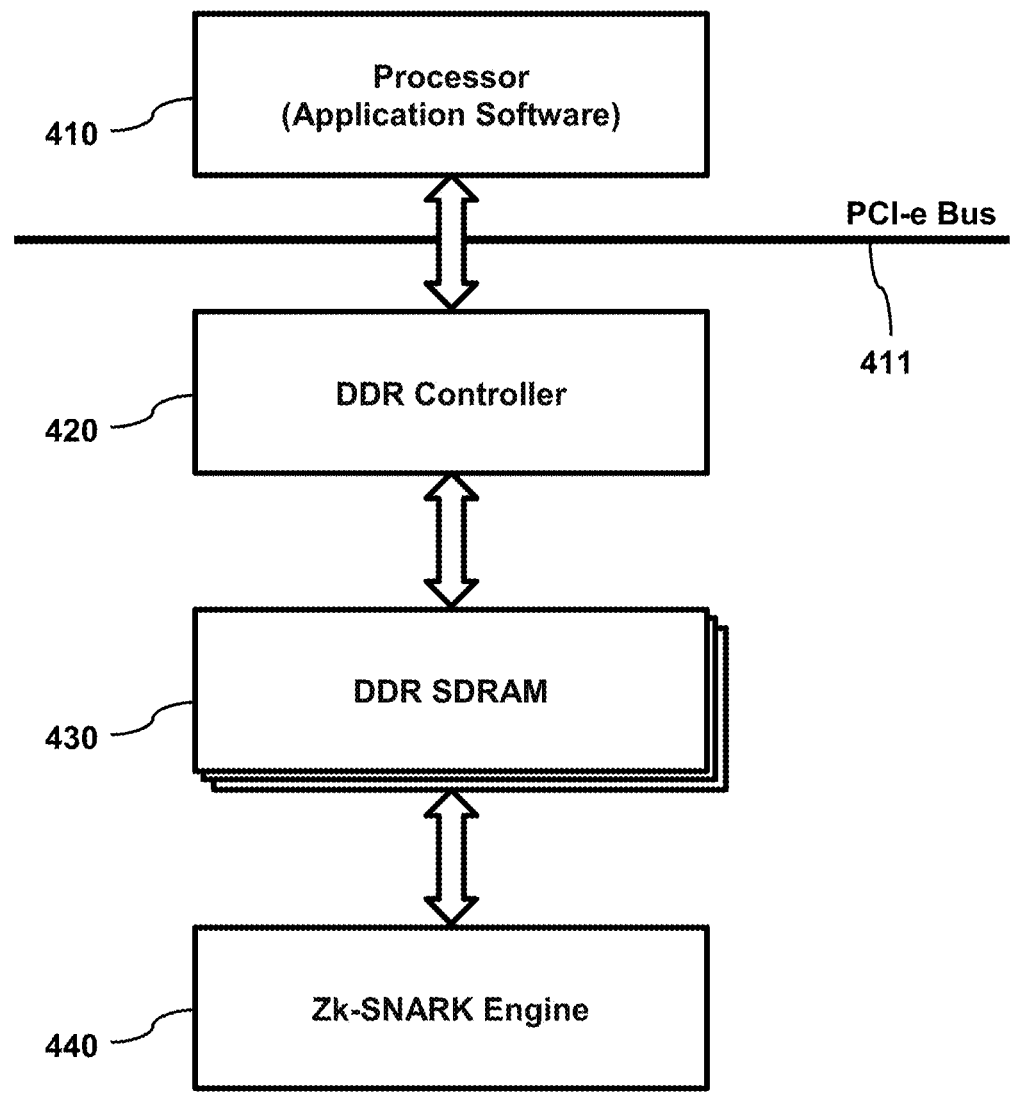
FIG. 2 depicts a block diagram illustrating the hardware accelerator for performing the computation for the zk-SNARK protocol in accordance with certain embodiments of the present disclosure.

FIG. 2 shows a structural block diagram of the hardware accelerator for performing the cryptographic verification under a zk-SNARK protocol. The cryptographic verification is executed on a dedicated semiconductor device. In particular, the dedicated semiconductor device can be configured to offer massive parallelism targeted for specific zk-SNARK algorithms, and programmable to change the algorithms. The method of the present disclosure may be implemented using one or more processors 410, such as a digital processor, an analog processor, a CPU, a microcontroller, a state machine, or other electronic processing units.

In certain embodiments, the processor 410 is configured to execute application software, which is programmed to respond to instructions stored in one or more memory devices. The processor 410 may be communicatively coupled instructions and data to a DDR controller 420 through a PCI-e bus 411 or the like, such as a PCI bus, a serial communication bus, a wireless communication interface, or other appropriate device connected directly or indirectly to a PCI-e bus. The DDR controller 420 or other memory controller may be used to drive the DDR SDRAM 430 or the like, where data is transferred to and from. The DDR SDRAM 430 is coupled to the zk-SNARK engine 440 to load the instructions and data for running the calculations of the zk-SNARK algorithms and receives the result from the zk-SNARK engine 440. The zk-SNARK engine 440 is configured to perform calculations based on a plurality of zk-SNARK algorithms, wherein the calculations involves finite field arithmetic operations such as MAC, FFT, iFFT, and ECP operation. The calculation results from the MAC, FFT, iFFT, and ECP operation are combined to obtain a final result, which is loaded to the processor 410. In certain embodiments, the DDR controller 420, the DDR SDRAM 430, and the zk-SNARK engine 440 may be provided on the cloud, a network server, or a node in a blockchain, remotely accessible by the processor 410 via wired or wireless communication.

Figure 3:
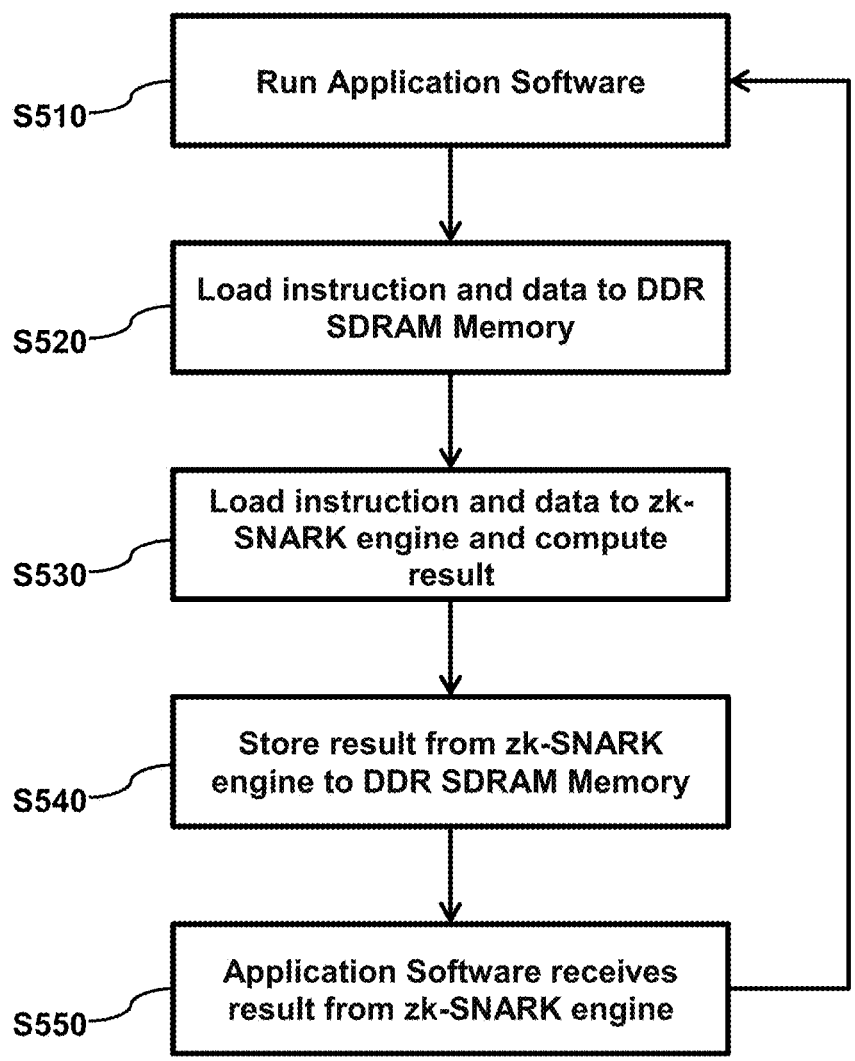
FIG. 3 depicts a flow diagram illustrating the method for accelerating the cryptographic verification under a zk-SNARK protocol in accordance with certain embodiments of the present disclosure.

Referring to FIG. 3, the method for accelerating the cryptographic verification under a zk-SNARK protocol is depicted. The method is initiated by running the application software S510. The application software may load instruction and data to the DDR SDRAM S520, preferably through a PCI-e bus 411 and a DDR controller 420. The instruction and data are then loaded to the zk-SNARK engine and compute a result S530. The result may be a verification result, which may be an acceptance 320 or a rejection 330. In certain embodiments, the result may be the proof 220 as generated from the step of proof generation 200, while the step of proof verification 300, which is less computationally intensive, is performed by software implementation. As a result, a dedicated hardware accelerator is used in the present disclosure to perform the computation operations. The result is stored from the zk-SNARK engine to the DDR SDRAM S540. Lastly, the application software receives the result from the zk-SNARK engine S550.

Generally, in a zk-SNARK protocol, a computation problem is first expressed in a high-level programming language. The computation problem is required to be expressed via a set of quadratic constraints. Then the proof 220 shows that such a set of constraints is satisfiable. In particular, the computation problem is first converted to a R1CS, which is a sequence of groups of three vectors (a,b,c) with a solution represented by a vector s. Next, the R1CS is converted into QAP form, which represents the computation problem using polynomial equations (A, B, C). Therefore, when there is an input, a solution can be created, which is referred to as a "witness" 221 to the QAP.

Figure 4:
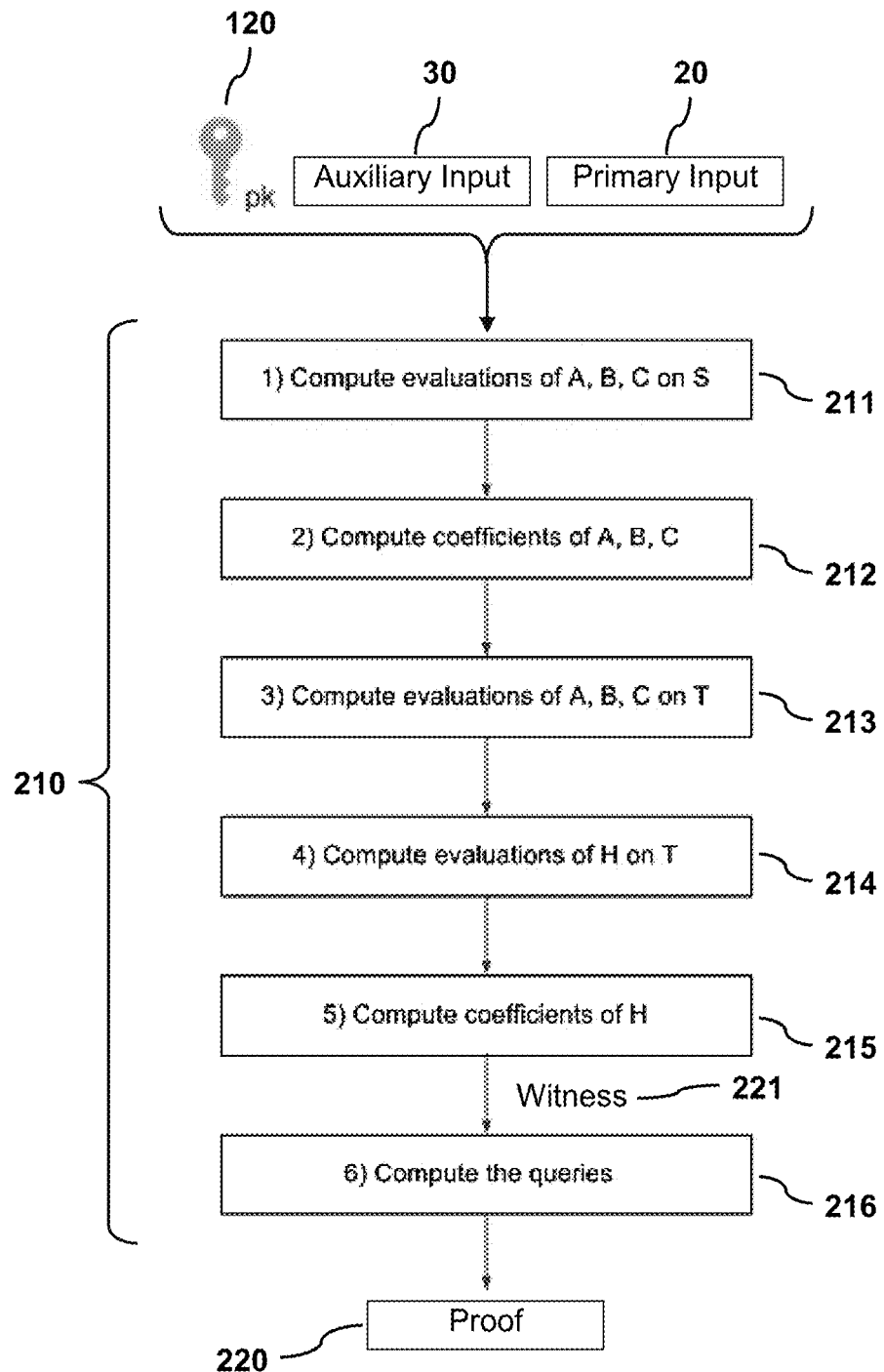
FIG. 4 depicts a flow chart illustrating the steps for generating proof in accordance with certain embodiments of the present disclosure.

The generation of proof in the zk-SNARK protocol is computed by performing calculation in accordance with the flow chart as shown in FIG. 4. The PF 210 takes pk 120 as an input, primary input 20 as a common input, and auxiliary input 30 as a private input. The PF 210 is tasked to produce a proof 220. The inputs are represented as:

Full variable assignment (fva)={primary input,auxiliary input}; (1)

Constraint system (CS)={$CS_a, CS_b, CS_c$}; and (2)

elliptic point (P), wherein:
$CS_a$ is constraint system of a;
$CS_b$ is constraint system of b; and
$CS_c$ is constraint system of c.

In the present disclosure, the polynomials A, B, C are evaluated for computing the proof 220. A, B, C and the inputs are sequence of data with 256 bits, and the number of data is in the order of $2^{21}$. The computation in PF 210 can be partitioned into two parts. First is to compute the coefficients of the polynomial H 215. Second is to use the coefficients of H, QAP witness 221, and the pk 120 to compute the proof 220.

The first step is to perform evaluations of A, B, C on set S 211, according to the following equations:

$$aA[i] = \sum_{k=0}^{m-1} fva[k] csa[i][k];$$ (3)

$$aB[i] = \sum_{k=0}^{m-1} fva[k] csb[i][k]; \text{ and}$$ (4)

$$aC[i] = \sum_{k=0}^{m-1} fva[k] csc[i][k];$$ (5)

wherein: i=0 to m-1, m=$2^{21}$; and
S is set of {aA[i], aB[i], aC[i]} for i=0 to $2^{21}$.

The coefficients of the polynomials A, B, C are computed by iFFT 212, as follow:

Coefficients of aA=iFFT(aA); (6)

Coefficients of aB=iFFT(aB); and (7)

Coefficients of aC=iFFT(aC). (8)

The zk-patch can be computed by:

$H[i] = d2*aA[i] + d1*bB[i]$, wherein: $i=0$ to $m-1$, $m=2^{21}$. (9)

$H[0] = H[0] - d3 - d1*d2$, wherein $d1, d2$ and $d3$ are 256-bit random numbers. (10)

$H[m] = H[m] + d1 + d2$, wherein $m=2^{21}$. (11)

On set T, the polynomials A, B, C are evaluated 213, as follow:

$aA[i] = aA[i]*g^i;$ (12)

$aA = FFT(aA);$ (13)

$aB[i] = aB[i]*g^i;$ (14)

$aB = FFT(aB);$ (15)

$aC[i] = aC[i]*g^i;$ and (16)

$aC = FFT(aC);$ (17)

wherein: i=0 to m-1, m=$2^{21}$, g is the multiplicative_generator (a 256-bit number).

The next step is to perform evaluation of polynomial H on set T 214, which is performed based on the following equations:

$H\_tmp[i] = aA[i]*aB[i] - aC[i];$ (18)

$H\_tmp^* = (g^m - 1)^{-1};$ (19)

wherein i=0 to m-1, m=$2^{21}$; and
T is a coset of S.

From the above, the coefficients of the polynomial H can be efficiently computed 215 via FFT techniques:

Coefficients of $H\_tmp$=iFFT($H\_tmp$); (20)

Coefficients of $H[i] = H[i] + H\_tmp[i]*g^{-1};$ (21)

wherein i=0 to m-1, m=$2^{21}$.

The queries are computed 216 based on a multi-scalar multiplication over elliptic curve to obtain the proof 220:

$$H\_query = \sum_{i=0}^{m} [i]P[i];$$ (22)

wherein:
P[i] is the Elliptic point; and
i=0 to m, m=$2^{21}$.

As demonstrated above, the zk-SNARK protocol involves solving multiple large instances of computation steps comprising polynomial arithmetic over cryptographically large prime numbers and about multi-scalar multiplication over elliptic curve. Both hardware and software implementation of a direct computation may be overly complicated and a circuit involved may be large and complex. In an effort to reduce the processing time of the proof generation 200 and proof verification 300, hardware accelerator, such as FPGA, ASIC, or other semiconductor devices, based on one or more fast algorithms is used. Disclosed herein is an accelerator configured to reduce the computation time for the zk-SNARK protocol, and comprises a processing unit 441 having one or more MAC units 600, one or more FFT units 700, one or more ECP units 800, or any combination thereof. The MAC unit 600 is configured to perform multiplication and addition operations. The FFT unit 700 performs large size FFT operations, which is configured to compute FFT algorithm with $2^{21}$ points. The use of the FFT unit 700 is needed for performing large size FFT and iFFT of $2^n$ points (where n>11, particularly for n=21) in the zk-SNARK engine 440. The ECP unit 800 is based on an elliptic curve of prime order. The processing unit 441 is a built-in structure in the zk-SNARK engine 440 for running the calculations of the zk-SNARK algorithms.

Figure 5:
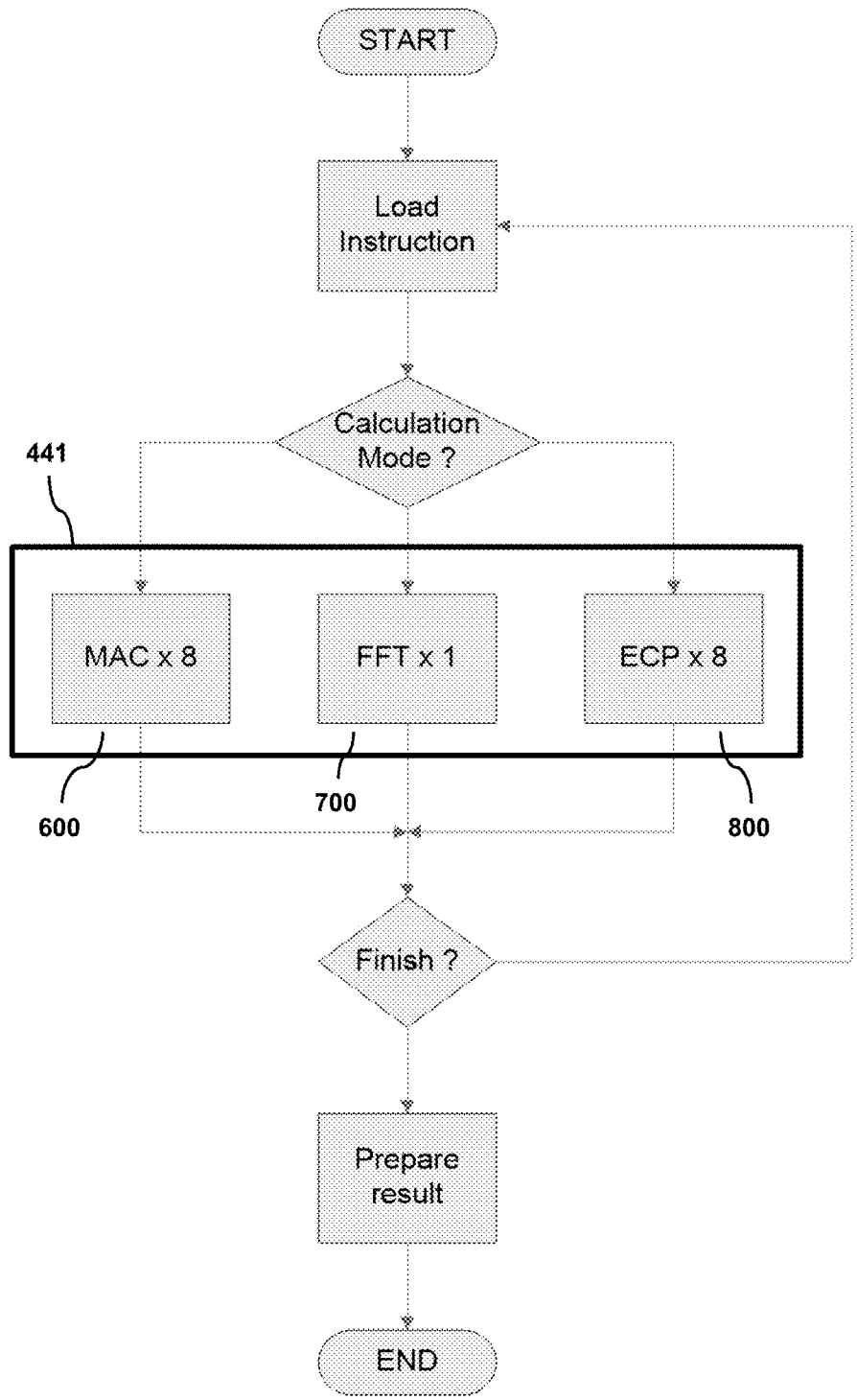
FIG. 5 depicts the zk-SNARK engine and the corresponding logic flow in the zk-SNARK engine in accordance with certain embodiments of the present disclosure.

The processing time can be reduced by running the MAC units 600, the FFT units 700, and the ECP units 800 in parallel, which is optimized based on the demand in the computation power. FIG. 5 shows one exemplary structure of the zk-SNARK engine 440, and the corresponding logic flow in the zk-SNARK engine 440. The processing unit 441 in the zk-SNARK engine 440 comprises eight MAC units 600, one FFT unit 700, and eight ECP units 800. On circuit level implementation, FPGA may be used to realize the logic design of the processing unit 441. The zk-SNARK engine 440 loads the instruction and data from DDR SDRAM 430, and determines the calculation mode. The MAC units 600, the FFT unit 700, and the ECP units 800 are separated structures that may run in parallel. If the operation is finished, the result is prepared. If the operation is not finished, further instruction and data are loaded from the DDR SDRAM 430.

In certain embodiments, the MAC units 600 is a finite field computing element configured to perform the following data operations:

$OP1: R_0 = \sum_{i=0}^{N-1} a_i b_i$ (23)

$OP2: Ri = a_i b_i + c_i d_i$ for $i=0$ to $N-1$ (24)

$OP3: Ri = a_i r_i$ for $i=0$ to $N-1$ (25)

$OP4: Ri = a_i r$ for $i=0$ to $N-1$ (26)

$OP5: Ri = a_i b_i - c_i$ for $i=0$ to $N-1$ (27)

$OP6: Ri = a_i r_i + b_i$ for $i=0$ to $N-1$ (28)

wherein:

$R_0$, $R_i$, $a_i$, $b_i$, $c_1$, $d_i$, $r$ and $r_i$ are 256-bit integer;

$N=2^n$, where $n>11$ (typically $n=21$); and

Prime=0x30644e72e131a029685045b68181585d2833e84879b9709143e1f593f000000

Figure 6:
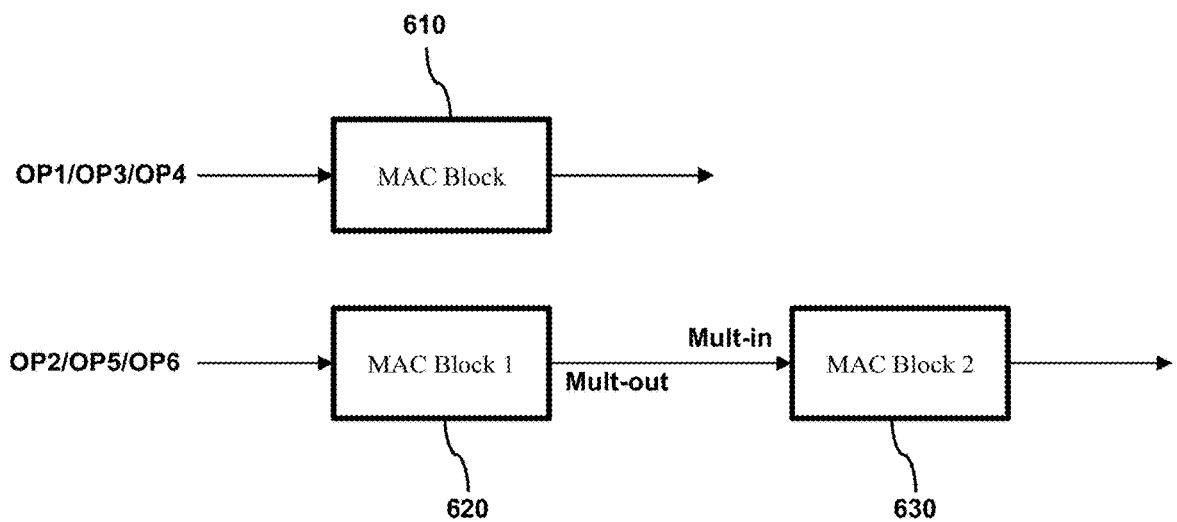
FIG. 6 depicts a simplified diagram illustrating the use of MAC blocks for solving MAC OP1-6 in accordance with certain embodiments of the present disclosure.
Figure 7:
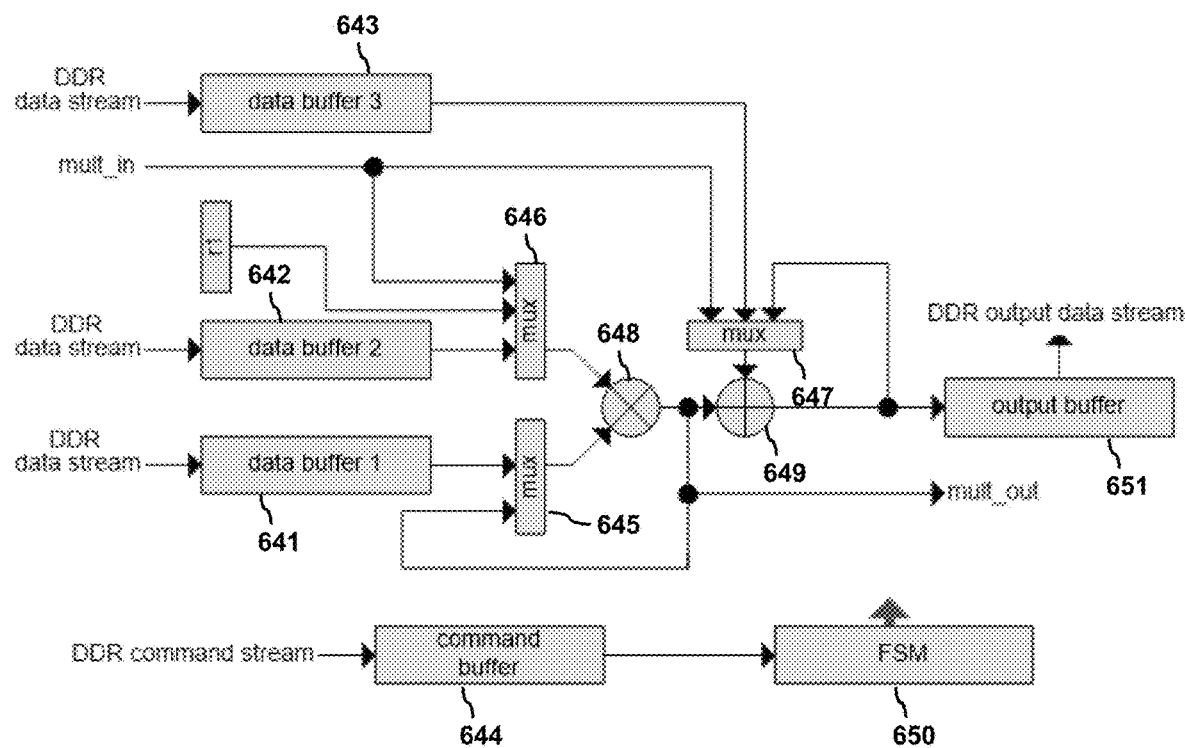
FIG. 7 depicts a schematic diagram illustrating an implementation of a MAC block in accordance with certain embodiments of the present disclosure.

The MAC units 600 may be implemented within the accelerator of the present disclosure or otherwise as one or more separated devices connected to the accelerator. The MAC units 600 comprises a plurality of MAC blocks 610, 620, 630, the plurality of MAC blocks 610, 620, 630 is partitioned into plural MAC block groups. Each MAC block group is configured to perform data operations and consisting of either one or two MAC blocks. As shown in FIG. 6, OP1 (23), OP3 (25), and OP 4 (26) may be solved using one MAC block 610. OP2 (24), OP5 (27), and OP6 (28) may be solved using a cascade of two MAC blocks 620, 630. Each of the plurality of MAC blocks 610, 620, 630 is a finite field computing element configured to perform multiplication and addition operations, and may be implemented in accordance with the structure shown in FIG. 7.

In a MAC block 610, 620, 630, DDR command is coupled to and received by a command buffer 644. The DDR command is used to control FSM 650 of the MAC block, which controls the MAC calculations to arrive with the output data. The DDR data is coupled to data buffers 641, 642, 643, and multiplexers 645, 646, 647, for selecting the data for performing multiplication and addition using the multiplier 648 and adder 649. The multiplier 648 is configured to execute Montgomery Multiplication over a finite field with 256×256 bit numbers. If two-stage MAC is needed, the multiplier output (mult-out) of MAC block 1 620 is coupled to the multiplier input (mult-in) of the MAC block 2 630. The result is coupled to an output buffer 651.

Figure 8:
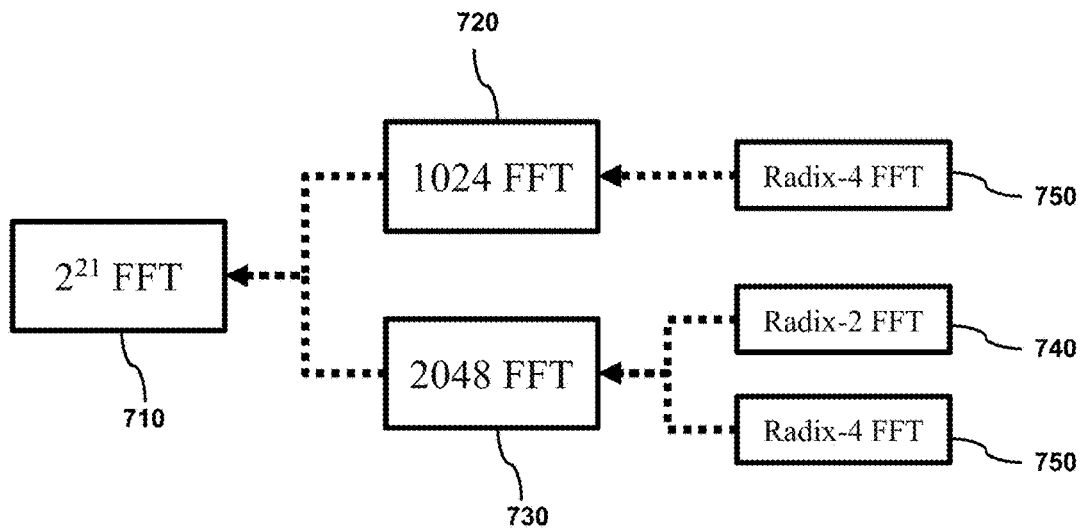
FIG. 8 depicts a simplified diagram illustrating the decomposition of the $2^{21}$-point FFT unit in accordance with certain embodiments of the present disclosure.

In certain embodiment, an FFT unit 700 is configured to perform large size FFT operation, such as a computation of FFT algorithm with $2^{21}$ points in length. FIG. 8 shows a simplified diagram illustrating the decomposition of the $2^{21}$-point FFT unit 710. In order to perform large size FFT, such as a $2^{21}$-point FFT unit 710, the present disclosure utilizes a number of smaller and more manageable FFT hardware units to evaluate, which includes a 1024-point FFT unit 720 and a 2048-point FFT unit 730 operating repeatedly over the $2^{21}$-field variables. The 1024-point FFT unit 720 utilizes a plurality of radix-4 FFT units 750, while the 2048-point FFT unit 730 utilizes a plurality of radix-2 FFT units 740 and a plurality of radix-4 FFT units 750. The FFT unit 700 may be implemented within the accelerator of the present disclosure or otherwise as one or more separated devices connected to the accelerator.

Figure 9:
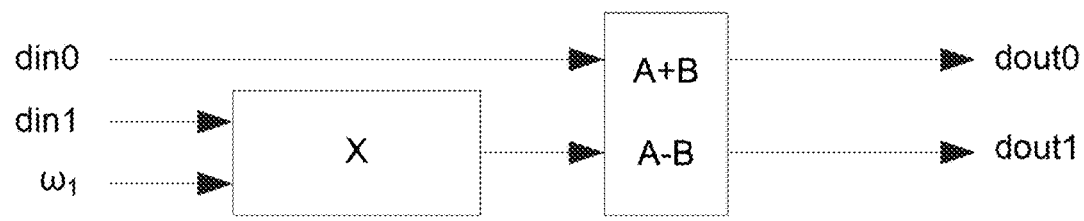
FIG. 9 depicts a schematic diagram of a radix-2 FFT unit.

FIG. 9 shows a radix-2 FFT unit 740, which is a 2-point FFT unit. In this implementation, din0 and din1 are inputs, while dout0 and dout1 are outputs. $\omega_1$ is the twiddle factor.

Figure 10:
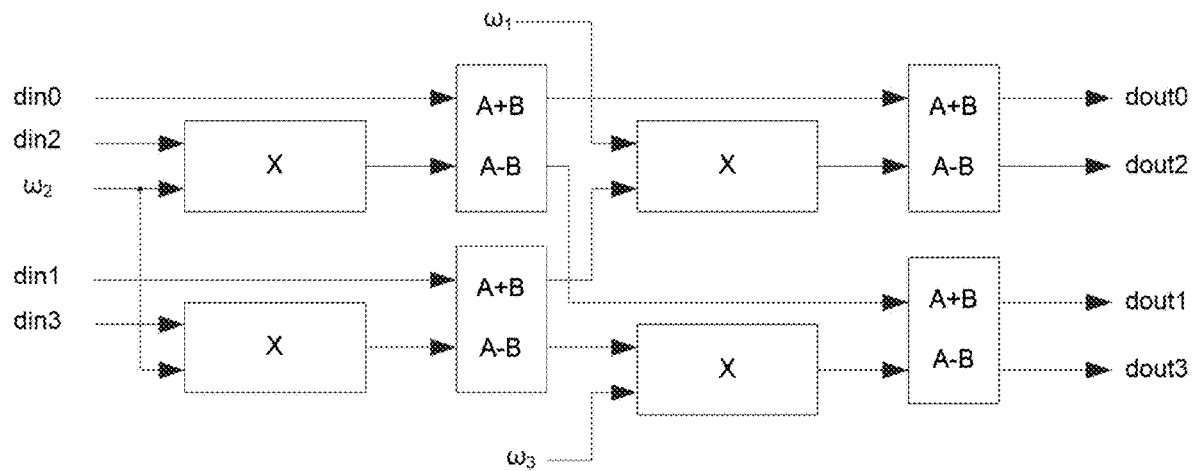
FIG. 10 depicts a schematic diagram of a radix-4 FFT unit.

FIG. 10 shows a radix-4 FFT unit 750, which is a 4-point FFT unit. In this implementation, din0, din1, din2, and din3 are inputs, while dout0, dout1, dout2, and dout3 are outputs. $\omega_1$, $\omega_2$, and $\omega_3$ are the corresponding twiddle factors.

Figure 11:
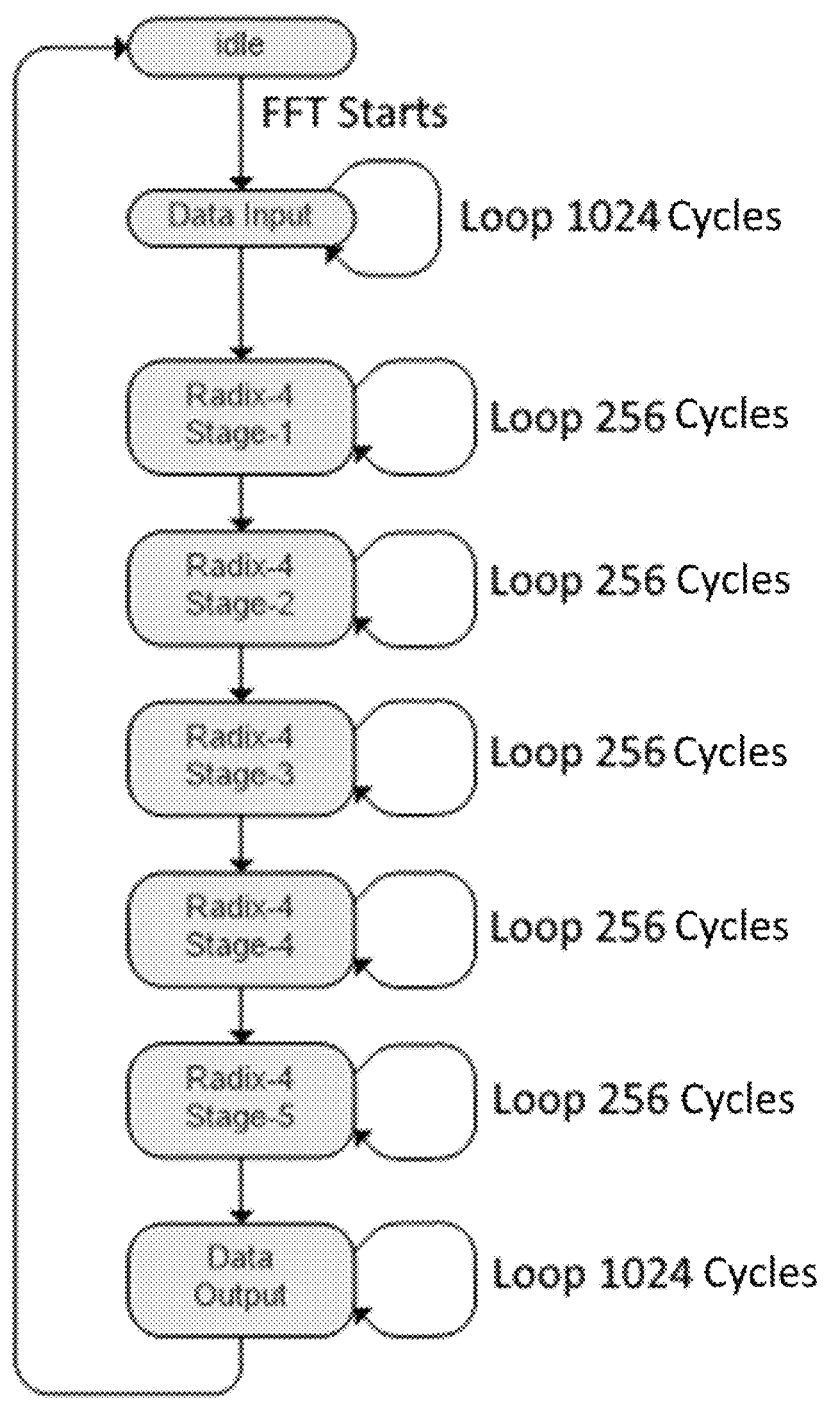
FIG. 11 depicts a computation flow of a 1024-point FFT unit.

FIG. 11 shows a computation flow of a 1024-point FFT unit 720, comprising five stages each with an iteration of 256 cycles of radix-4 FFT unit 750.

Figure 12:
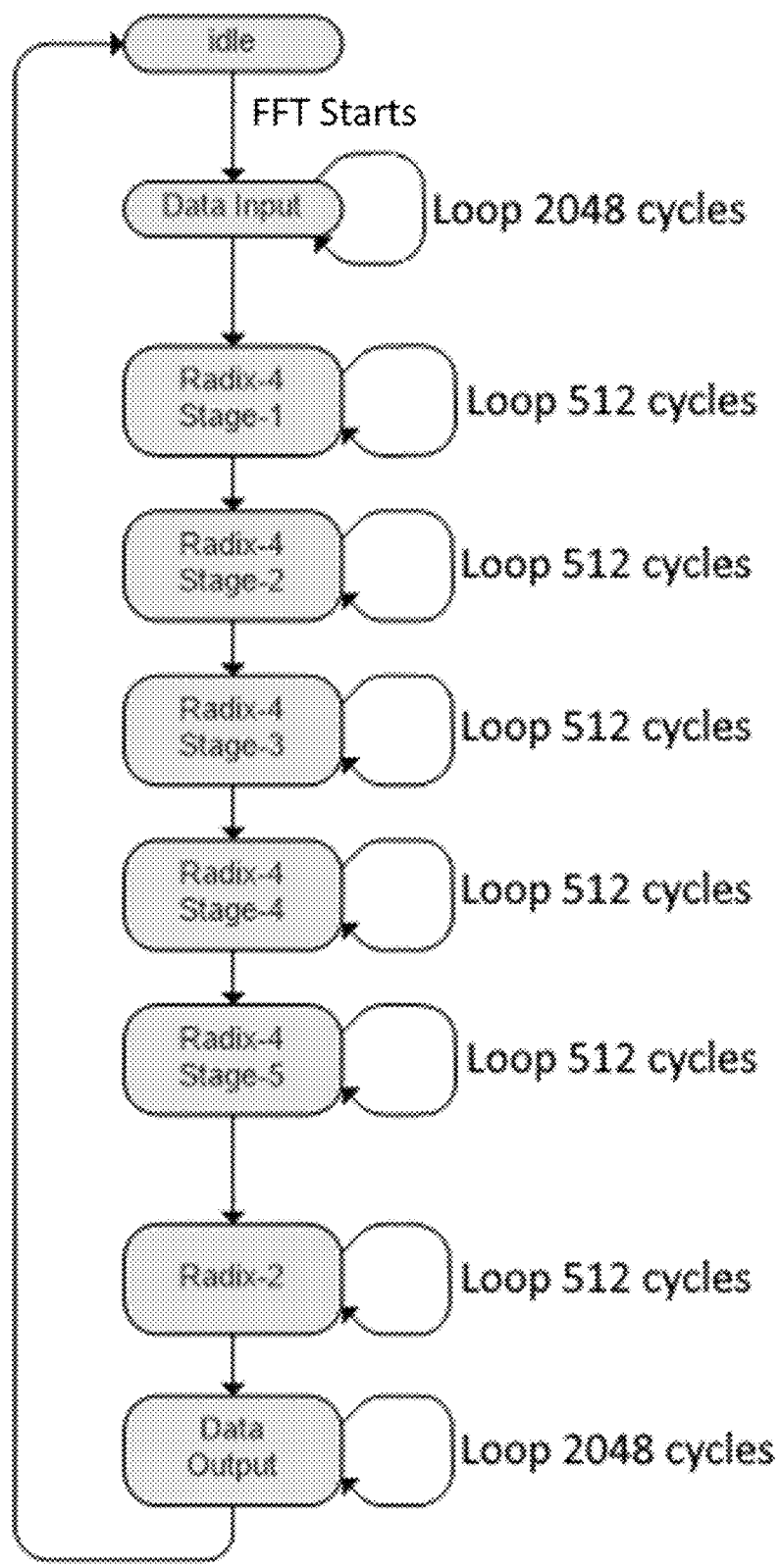
FIG. 12 depicts a computation flow of a 2048-point FFT unit.

FIG. 12 shows a computation flow of a 2048-point FFT unit 730, comprising five stages each with an iteration of 512 cycles of radix-4 FFT unit 750, and an iteration of 512 cycles of radix-2 FFT unit 740.

In order to perform large size FFT or iFFT, which may be in the order of $2^{21}$, both the 1024-point FFT unit 720 and the 2048-point FFT unit 730 are used. Assume that $N=2^{11}=2048$, and $M=2^{10}=1024$. P is denoted as $M \times N = 2^{21}$. The FPGA for constructing an FFT or an iFFT unit in the order of $2^{21}$ may comprises the following logic steps:

Step 1: Partitioning the $2^{21}$ variables into 1024 groups, each group has $2^{11}$ variables:

$$G_r = X_{kM} \tag{29}$$

For example:

$$G_0 \text{ contains } \{X_0, X_M, X_{2M}, \ldots X_{P-M}\} \tag{30}$$

$$G_1 \text{ contains } \{X_1, X_{M+1}, X_{2M+1}, X_{P-M+1}\} \tag{31}$$

wherein:

$k=0 \ldots N-1$; and $r=0 \ldots M-1$.

Step 2: Performing 2048-point FFT on all the 1024 groups from step 1 using the 2048-point FFT unit 730:

$$Y_r = \text{FFT2048}(G_r) \tag{32}$$

wherein:

$k=0 \ldots N-1$; and $r=0 \ldots M-1$.

Step 3: Multiplying each variable of $Y_r$ by $\omega_{rk}$:

$$Z_r(k) = Y_r(k) \times \omega_{rk} \tag{33}$$

wherein:

$\omega$ is the $P_{th}$ root of unity;

$k=0 \ldots N-1$; and $r=0 \ldots M-1$.

Step 4: Performing 1024-point FFT on the following 2048 groups using the 1024-point FFT unit 720:

$$U_k = \text{FFT1024}(Z_r(k)) \tag{34}$$

wherein:

$k=0 \ldots N-1$; and $r=0 \ldots M-1$.

Step 5A: Computing the output of the original large FFT as:

$$\text{FFT}(X_P) = \{U_0, U_1, U_{N-1}\} \tag{35}$$

Step 5B: Computing the output of the original large iFFT as:

$$\text{iFFT}(X_P) = \{U_0, U_1, \ldots U_{N-1}\} / 2^{21} \tag{36}$$

In certain embodiments, the ECP unit 800 is configured to implement a fast ECP algorithm using hardware accelerator. The ECP unit 800 may be implemented within the accelerator of the present disclosure or otherwise as one or more separated devices connected to the accelerator.

The ECP algorithm is:

$$R_i = \sum_{i=0}^{N-1} d_i P_i \tag{37}$$

wherein:

$N=2^n$, where $n>11$ (typically $n=21$);

$d_i$ is a scalar; and $R_i$ and $P_i$ are points on the elliptic curve.

When $d_i$ are large numbers with 256 bits, the multiplication of the scalar $d_i$ with the elliptic point $P_i$ is very time consuming, and may require high computation power. Therefore, it is advantageous to have a hardware accelerator configured to implement the fast ECP algorithm and calculate the summation of $d_i P_i$ in a faster way.

Figure 13:
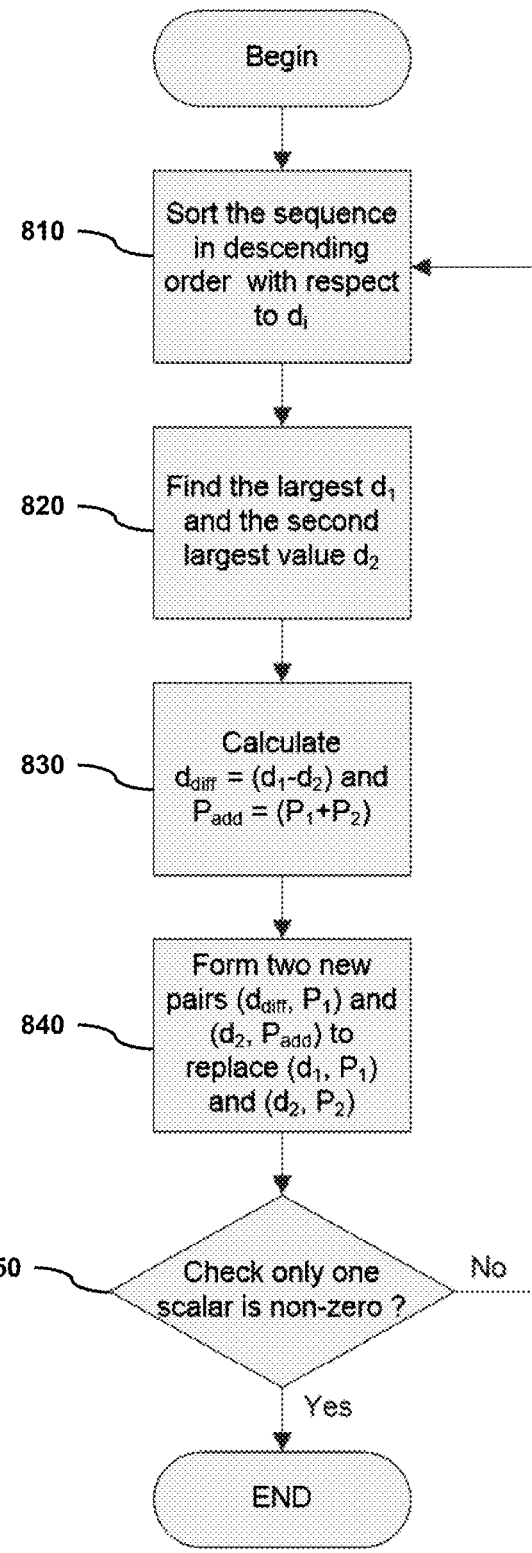
FIG. 13 depicts a flow diagram illustrating the logic in the FPGA implementing a fast ECP algorithm in accordance with certain embodiments of the present disclosure.

FIG. 13 is a flow diagram illustrating the logic in the FPGA implementing a fast ECP algorithm. The ECP unit 800 includes a sorting engine to sort the sequence in descending order with respect to the scalar $d_i$ 810. From the sorted results, the largest value $d_1$ and the second largest value $d_2$ are found 820. Consider that:

$$d_1P_1 + d_2P_2 = d_1P_1 - d_2P_1 + d_2P_1 + d_2P_2 \quad (38)$$
$$= (d_1 - d_2)P_1 + d_2(P_1 + P_2)$$
$$= d_{diff}P_1 + d_2P_{add}$$

wherein:

$d_1$ and $d_2$ are 256-bit number and $d_1 > d_2$;

$d_{diff}$ is the difference of scalar, which has fewer bits than $d_1$ and $d_2$;

$P_1$ and $P_2$ are points on the elliptic curve with respect to $d_1$ and $d_2$;

$P_{add}$ is the addition of two elliptic points $P_1$ and $P_2$; and Prime=0x30644e72e131a029685045b68181585d2833e84879b9709143e1f593f000000

Therefore, the largest value $d_1$ and the second largest value $d_2$ are used to calculate the $d_{diff}$, and the corresponding points on the elliptic curve are added to obtain $P_{add}$ 830. The two new pairs of points $(d_{diff}, P_1)$ and $(d_2, P_{add})$ are used to replace the original points $(d_1, P_1)$ and $(d_2, P_2)$ 840. The ECP unit 800 is then configured to check whether only one scalar is non-zero or not 850. If more than one scalar is non-zero, the above steps are repeated. Otherwise, the ECP calculation is completed.

The above FPGA implementation of the logic for the fast ECP algorithm is configured to calculate the summation of $d_iP_i$ in a faster way. From the simulation result with N=512, using direct addition and multiplication may take 25,986,945 clock cycles to complete. The high computation demand is caused by the calculations involving $d_1$ and $d_2$, which are both 256 bits long. In contrast, the fast ECP algorithm in accordance with the present disclosure may take only 5,095,478 clock cycles to complete the same computation. The computation time is significantly reduced using the fast ECP algorithm of the present disclosure. This method can advantageously perform calculation based on $d_1 - d_2$, which is only around 10 bits long. Therefore, the hardware accelerator of the present disclosure can reduce the bit-length of the scalar $d_i$ such that the computation power required for performing multiplication of the scalar $d_i$ with the elliptic point $P_i$ is reduced. The efficiency of the ECP computation can be improved significantly, and in one simulation the computation is faster by approximately 5 times.

Referring back to the equations for computing the proof 220, the zk-SNARK engine 440 may utilize the processing unit 441 to perform the computation. The first step of the proof generation 200, comprising the equations (3)-(5), involves multiplication and addition operations. The calculation is performed using the MAC unit 600 to execute the OP1 (23).

The second step of the proof generation 200 is to perform iFFT in the order of $2^{21}$, which utilizes the FFT unit 700 of the processing unit 441 to compute the coefficients of the polynomials in equations (6)-(8). The zk-patch is also computed by equations (9)-(11), which can be performed by using MAC unit 600. In particular, the computation of H[i] is performed using OP2 (24), H[0] uses OP5 (27) for three times, and H[m] is performed using OP6 (28) for two times.

The third step of the proof generation 200 involves multiplication operations for determining aA[i], aB[i], and aC[i] in accordance with the equations (12), (14), (16). Each of the multiplication operations is performed by using MAC unit 600 according to the OP3 (25). For the large size FFT operations in equation (13), (15), (17), the FFT unit 700 is used for accelerating the calculations.

The fourth step of the proof generation 200 involves computations of H_tmp[i] and H_tmp* using equations (18) and (19). The fourth step can be effectively accelerated by using MAC unit 600. The computation of H_tmp[i] in (18) is performed using OP5 (27), and the H_tmp* in (19) uses OP4 (26).

The fifth step of the proof generation 200 is to compute the coefficients of the polynomial H. Similar to the second step, iFFT in the order of $2^{21}$ is performed which utilizes the FFT unit 700 of the processing unit 441 to compute the coefficients of the polynomials in equation (20). The coefficients of H[i] can be determined by using the MAC unit 600 according to the OP6 (28).

The last step of the proof generation 200 is related to the elliptic point curve. Therefore, the H_query, as shown in equation (22), can be determined efficiently by using the ECP unit 800 based on the fast ECP algorithm as demonstrated in FIG. 13.

In certain embodiments, the hardware accelerator may comprise a DDR controller 420, a DDR SDRAM 430, and a zk-SNARK engine 440, wherein the zk-SNARK engine 440 further comprises one or more processing units 441 running in parallel. In one simulation, four processing units 441 are used to offer massive parallelism targeted for specific zk-SNARK algorithms and implement the zk-SNARK engine 440 for handling the computationally intensive operations. With 4 processing units 441, there are totally 32 MAC units 600, 4 FFT units 700, and 32 ECP units 800. The clock rate of the processing units 441 may also be increased to further improve the computation speed. By applying the method of the present disclosure in a Xillinx FPGA operating at 200 MHz, the computation time required for performing the zk-SNARK is reduced to 4 seconds, whereas a software implementation of the same zk-SNARK may require as much as 40 seconds.

This illustrates the fundamental method and apparatus for accelerating the zk-SNARK in accordance with the present disclosure. It will be apparent that variants of the above-disclosed and other features and functions, or alternatives thereof, may be combined into many other different methods or apparatuses. The modules and components in the hardware accelerator, and the circuit blocks in the processors are recited as examples illustrating the concepts and the embodiments of the present disclosure, and can be substituted with other generic modules, components, or circuit blocks throughout the specification. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A processing unit for computing a cryptographic verification under a zero knowledge succinct non-interactive argument of knowledge (zk-SNARK) protocol, comprising a semiconductor device configured or fabricated to provide a circuit level realization of logic functionalities comprising:

one or more multiply-accumulate operation (MAC) logics;

one or more fast Fourier transform (FFT) logics; and one or more elliptic curve processor (ECP) logics for performing a multi-scalar multiplication over an elliptic curve to obtain a proof, wherein:

the one or more ECP logics are configured to reduce a bit-length of a scalar $d_i$ in an ECP algorithm used for generating the proof, thereby the cryptographic verification requires less computation power;

the ECP logics comprises a sorting engine to sort the scalar $d_i$ in descending order, such that the ECP algorithm performs addition and multiplication based on a difference of scalar $d_{diff}$ having fewer bits than $d_i$, wherein the one or more ECP logics are configured to:

find a largest value $d_1$, and a second largest value $d_2$ with respect to the scalar $d_i$, calculate the difference of scalar $d_{diff}=d_1-d_2$, having fewer bits than $d_1$ and $d_2$, and an addition of $P_1$ and $P_2$, and obtain two new pairs of points $(d_{diff}, P_1)$ and $(d_2, P_{add})$ to replace original points $(d_1, P_1)$ and $(d_2, P_2)$, where:

$P_1$ and $P_2$ are points on the elliptic curve with respect to $d_1$ and $d_2$, and $P_{add}$ is the addition of $P_1$ and $P_2$; and the ECP algorithm is $R_i=\Sigma_{i=0}^{N-1} d_i P_i$; where: $N=2^n$; $n>11$; $d_i$ is a scalar, and $R_i$ and $P_i$ are points on the elliptic curve.

2. The processing unit of claim 1, wherein the MAC logic comprises a plurality of MAC blocks, wherein: each of the plurality of MAC blocks is an executable finite field computing element; and the plurality of MAC blocks are partitioned into plural MAC block groups, each MAC block group being configured to perform data operations and consisting of either one or two MAC blocks.

3. The processing unit of claim 2, wherein each of the plurality of MAC blocks comprises:
an adder; and
a multiplier configured to execute Montgomery Multiplication over a finite field.

4. The processing unit of claim 1, wherein the one or more FFT logics are configured to perform a large size FFT operation and a large size inverse fast Fourier transform (iFFT) operation by decomposing the large size FFT operation or the large size iFFT operation into a number of smaller FFT logics.

5. The processing unit of claim 4, wherein the smaller FFT logics comprise a 1024-point FFT logic and a 2048-point FFT logic, wherein:
the large size FFT operation has $2^{21}$ points:
the large size iFFT operation has $2^{21}$ points;
the 1024-point FFT logic utilizes a plurality of radix-4 FFT logics: and
the 2048-point FFT logic utilizes a plurality of radix-2 FFT logics and the plurality of radix-4 FFT logics.

6. The processing unit of claim 1, wherein the logic functionalities comprise four MAC logics, one FFT logic, and four ECP logics.

7. An accelerator for computing a cryptographic verification under a zero knowledge succinct non-interactive argument of knowledge (zk-SNARK) protocol, comprising a zk-SNARK engine, wherein the zk-SNARK engine comprises one or more processing units running in parallel, wherein each of the one or more processing units is a semiconductor device configured or fabricated to provide a circuit level realization of logic functionalities comprising:
one or more multiply-accumulate operation (MAC) logics;
one or more fast Fourier transform (FFT) logics; and
one or more elliptic curve processor (ECP) logics for performing a multi-scalar multiplication over an elliptic curve to obtain a proof,
wherein:
the one or more ECP logics are configured to reduce a bit-length of a scalar $d_i$ in an ECP algorithm used for generating the proof, thereby the cryptographic verification requires less computation power;
the ECP logic comprises a sorting engine to sort the scalar $d_i$ in descending order, such that the ECP algorithm performs addition and multiplication based on a difference of scalar $d_{diff}$ having fewer bits than $d_i$, wherein the one or more ECP logics are configured to:

find a largest value $d_1$, and a second largest value $d_2$ with respect to the scalar $d_i$, calculate the difference of scalar $d_{diff}=d_1-d_2$, having fewer bits than $d_1$ and $d_2$, and an addition of $P_1$ and $P_2$, and obtain two new pairs of points $(d_{diff}, P_1)$ and $(d_2, P_{add})$ to replace original points $(d_1, P_1)$ and $(d_2, P_2)$, where:

$P_1$ and $P_2$ are points on the elliptic curve with respect to $d_1$ and $d_2$, and $P_{add}$ is the addition of $P_1$ and $P_2$; and the ECP algorithm is $R_i=\Sigma_{i=0}^{N-1} d_i P_i$; where: $N=2^n$; $n>11$; $d_i$ is a scalar; and $R_i$ and $P_i$ are points on the elliptic curve.

8. The accelerator of claim 7, wherein:
the zk-SNARK engine comprises at least four processing units; and
each of the one or more processing unit comprises four MAC logics, one FFT logic, and four ECP logics.

9. The accelerator of claim 7 further comprising a double data rate (DDR) controller and a DDR synchronous dynamic random-access memory (SDRAM), wherein the DDR controller is communicatively coupled to a processor, wherein the processor is configured to execute an application software for responding to instructions.

10. The accelerator of claim 9, wherein the accelerator is provided on a network server remotely accessible by the processor.

11. A method for computing a cryptographic verification under a zero knowledge succinct non-interactive argument of knowledge (zk-SNARK) protocol, the cryptographic verification is executed on a dedicated semiconductor device, the method comprising:
executing an application software in one or more processors;
communicatively coupling instructions and data from the one or more processors to a double data rate (DDR) controller;
driving a DDR synchronous dynamic random-access memory (SDRAM), by the DDR controller, to load the instructions and data to a zk-SNARK engine;
performing calculations involving finite field arithmetic operations based on a plurality of zk-SNARK algorithms and a multi-scalar multiplication over an elliptic curve to obtain a proof, wherein the calculations comprise a multiply-accumulate operation (MAC), a fast Fourier transform (FFT), an inverse fast Fourier transform (iFFT), and an elliptic curve processor (ECP) operation, wherein the ECP operation is configured to:
reduce a bit-length of a scalar $d_i$ in an ECP algorithm used for generating the proof, thereby the cryptographic verification requires less computation power,
sort the scalar $d_i$ in descending order, such that the ECP algorithm performs addition and multiplication based on a difference of scalar $d_{diff}$ having fewer bits than $d_i$,
find a largest value $d_1$ and a second largest value $d_2$ with respect to the scalar $d_i$,
calculate the difference of scalar $d_{diff}=d_1-d_2$ having fewer bits than $d_1$ and $d_2$, and an addition of $P_1$ and $P_2$, and obtain two new pairs of points $(d_{diff}, P_1)$ and $(d_2, P_{add})$ to replace original points $(d_1, P_1)$ and $(d_2, P_2)$, where: $P_1$ and $P_2$ are points on the elliptic curve with respect to $d_1$ and $d_2$, and $P_{add}$ is the addition of $P_1$ and $P_2$,
wherein the ECP algorithm is $R_i=\Sigma_{i=0}^{N-1} d_i P_i$; where: $N=2^n$; $n>11$; $d_i$ is a scalar; and $R_i$ and $P_i$ are points on the elliptic curve;

obtaining a final result by combining results from the calculations, and loading the final result to the processor.

12. The method of claim 11, wherein the zk-SNARK engine comprises one or more processing units running in parallel.

13. The method of claim 12, wherein each of the processing units comprises four MAC units, one FFT unit, and four ECP units.

14. The method of claim 11, wherein the MAC is performed using a finite field computing element configured to perform data operations.

15. The method of claim 11, wherein the FFT and the iFFT are performed by decomposing a large size FFT operation or a large size iFFT operation into a number of smaller FFT units.

16. The method of claim 11, wherein the DDR controller, the DDR SDRAM, and the zk-SNARK engine are provided on a network server remotely accessible by the processor.

* * * * *